United States Patent
Kim et al.

(10) Patent No.: US 10,615,872 B2
(45) Date of Patent: Apr. 7, 2020

(54) METHOD AND APPARATUS FOR MANAGING VISIBLE LIGHT COMMUNICATION DEVICES

(71) Applicant: YUYANG DNU CO., LTD., Hwaseong-si Gyeonggi-do (KR)

(72) Inventors: Sangok Kim, Seoul (KR); Byungoh Kim, Suwon-si (KR); Sang-ho Yoon, Suwon-si (KR); Seung-wan Roh, Suwon-si (KR); Seok-joo Koh, Daegu (KR); Sang Il Choi, Daegu (KR)

(73) Assignee: YUYANG DNU CO., LTD., Hwaseong-si (KR)

( * ) Notice: Subject to any disclaimer, the term of this patent is extended or adjusted under 35 U.S.C. 154(b) by 0 days.

(21) Appl. No.: 16/463,474

(22) PCT Filed: Nov. 24, 2017

(86) PCT No.: PCT/KR2017/013524
§ 371 (c)(1),
(2) Date: May 23, 2019

(87) PCT Pub. No.: WO2018/097647
PCT Pub. Date: May 31, 2018

(65) Prior Publication Data
US 2019/0356387 A1 Nov. 21, 2019

(30) Foreign Application Priority Data
Nov. 24, 2016 (KR) .......................... 10-2016-0157606

(51) Int. Cl.
*H04B 10/00* (2013.01)
*H04B 10/116* (2013.01)
*H04B 10/114* (2013.01)

(52) U.S. Cl.
CPC ....... *H04B 10/116* (2013.01); *H04B 10/1143* (2013.01); *H04B 10/1149* (2013.01)

(58) Field of Classification Search
CPC .............. H04B 10/116; H04B 10/1143; H04B 10/1149; H04B 10/1123; H04B 10/114;
(Continued)

(56) References Cited

U.S. PATENT DOCUMENTS 5,838,116 A * 11/1998 Katyl ................. H04B 10/1149
315/307
8,007,127 B2 8/2011 Kim et al.
(Continued)

FOREIGN PATENT DOCUMENTS

JP    2013255013 A    12/2013
KR   1020090065815 A   6/2009
(Continued)

OTHER PUBLICATIONS

International Search Report (in English and Korean) and Written Opinion (in Korean) issued in PCT/KR2017/013524, dated Feb. 9, 2018; ISA/KR.

*Primary Examiner* — Hibret A Woldekidan
(74) *Attorney, Agent, or Firm* — Harness, Dickey & Pierce, P.L.C.

(57) ABSTRACT

A visible light communication device management method and apparatus are disclosed. According to one aspect of the present disclosure, an object of the present disclosure is to provide an apparatus and method for checking and managing a membership of a terminal, such as a communication state and a location of a terminal managed by the server.

8 Claims, 5 Drawing Sheets

(58) Field of Classification Search
CPC .... H04B 10/2725; H04B 10/40; H04B 10/50; H04B 10/54; H04B 10/616; H04B 10/67; H04J 14/02; H05B 37/0272; H04W 16/28; H04W 84/12
USPC ..... 398/172, 118, 165, 166, 167.5, 128, 130
See application file for complete search history.

(56) References Cited

U.S. PATENT DOCUMENTS

| | | | |
|---|---|---|---|
| 8,180,565 B2 | 5/2012 | Won et al. | |
| 8,295,705 B2 * | 10/2012 | Kim | H04B 10/1149 398/103 |
| 8,326,526 B2 | 12/2012 | Won et al. | |
| 8,452,188 B2 * | 5/2013 | Shin | H04B 10/1149 398/172 |
| 8,488,976 B2 | 7/2013 | Son et al. | |
| 8,620,154 B2 * | 12/2013 | Li | H04W 76/19 398/1 |
| 9,031,416 B2 * | 5/2015 | Son | H04B 10/1149 398/127 |
| 9,088,361 B2 * | 7/2015 | Castor | H04B 10/1149 |
| 9,548,814 B2 * | 1/2017 | Cesnik | G09C 5/00 |
| 9,608,727 B2 * | 3/2017 | Aoyama | H04B 10/1149 |
| 10,131,365 B2 | 11/2018 | Kim et al. | |
| 10,142,020 B2 * | 11/2018 | Aoyama | H04L 7/0075 |
| 10,277,318 B2 | 4/2019 | Kim et al. | |
| 10,326,831 B2 * | 6/2019 | Aoyama | H04L 67/1006 |
| 10,484,828 B2 * | 11/2019 | Breuer | H04W 4/024 |
| 2009/0157309 A1 | 6/2009 | Won et al. | |
| 2010/0073928 A1 | 3/2010 | Kim et al. | |
| 2010/0209105 A1 * | 8/2010 | Shin | H04B 10/1149 398/58 |
| 2011/0069951 A1 | 3/2011 | Son et al. | |
| 2011/0313660 A1 | 12/2011 | Won et al. | |
| 2012/0089325 A1 | 4/2012 | Won et al. | |
| 2013/0279917 A1 | 10/2013 | Son et al. | |
| 2014/0085642 A1 * | 3/2014 | Kim | G01S 1/70 356/614 |
| 2015/0104184 A1 * | 4/2015 | Jeffrey | G09C 5/00 398/130 |
| 2016/0352751 A1 * | 12/2016 | Perrufel | H04L 63/0876 |
| 2017/0258666 A1 | 9/2017 | Kim et al. | |
| 2017/0307382 A1 | 10/2017 | Kim et al. | |
| 2018/0065644 A1 | 3/2018 | Kim et al. | |
| 2018/0101875 A1 | 4/2018 | Kim et al. | |
| 2018/0227052 A1 | 8/2018 | Kim et al. | |
| 2018/0276985 A1 | 9/2018 | Kim et al. | |
| 2018/0279435 A1 | 9/2018 | Kim et al. | |
| 2019/0132000 A1 | 5/2019 | Kim et al. | |
| 2019/0215063 A1 * | 7/2019 | Darabi | H04B 10/116 |
| 2019/0356386 A1 * | 11/2019 | Kim | H04B 10/116 |

FOREIGN PATENT DOCUMENTS

| | | |
|---|---|---|
| KR | 1020110031263 A | 3/2011 |
| KR | 102013006246 A | 6/2013 |
| WO | WO-2012157976 A2 | 11/2012 |

\* cited by examiner

METHOD AND APPARATUS FOR MANAGING VISIBLE LIGHT COMMUNICATION DEVICES

TECHNICAL FIELD

The present disclosure relates to a method and apparatus for managing visible light communication devices, in particular, a lighting device and a terminal.

BACKGROUND

The statements in this section merely provide background information related to the present disclosure and may not constitute prior art.

Visible light communication is wireless communication technology for transmitting visible light data composed of an on/off signal pattern based on the characteristics of fast response of a lighting device. When visible light communication is applied to a lighting device, the lighting device may transmit data to a terminal through visible light communication.

The server manages the lighting device and the terminal, and controls the lighting device to transmit data to all terminals located within the visible light transmission coverage of the lighting device. However, as various visible light communication IoT services were developed, a technology has been developed to control the server to transmit data only to a specific terminal, not to all terminals, using a lighting device. In such cases, the server needs to check the membership of the terminal, such as whether the terminal is in a communicable state or whether the terminal is continuously using the visible light communication IoT service. If the terminal is a mobile device, it is necessary to check if there is a need for the server to identify a lighting device under which the terminal is arranged. There is a need for the server to check whether the terminal is ready for communication so as to inform the visible light communication IoT system administrator of whether the terminal is out of service. Further, when a specific terminal is a mobile device, there is a need for the server to identify a lighting device under which the terminal is arranged so as to determine a lighting device to which data to be transmitted to the terminal is to be delivered.

SUMMARY

Therefore, it is one object of the present disclosure to provide an apparatus and method for checking and managing membership of a terminal managed by a server, such as a communication state and the location of the terminal.

In accordance with one aspect of the present invention, provided is a lighting device for checking state information about one or more terminals used for visible light communication, including a communication unit configured to receive a management message to be transmitted to the one or more terminals from a server and a response message to the management message from a preset terminal, a data manager configured to divide the management message into a header and a payload to check information indicating control data for checking the state information included in the header, include, in the header, information indicating a control message for checking the state information so as to be transmitted using visible light communication, and regenerate a management message having a payload including information for instructing the preset one of the one or more terminals to respond, a lighting unit configured to modulate the regenerated management message into a visible light signal and transmit the visible light signal to the one or more terminals, a controller configured to generate a list of the preset terminals and update the list of the preset terminals by comparing the list of the preset terminals with the identifiers of the terminals included in the response message to the management message, and a database configured to store identifiers of the one or more terminals and the list of the preset terminals.

As described above, according to one aspect of the present disclosure, as the membership, such as the communication status and the location of a terminal managed by a server, is checked and managed, an administrator of a visible light communication IoT service can easily manage the terminal.

DETAILED DESCRIPTION

Figure 1:
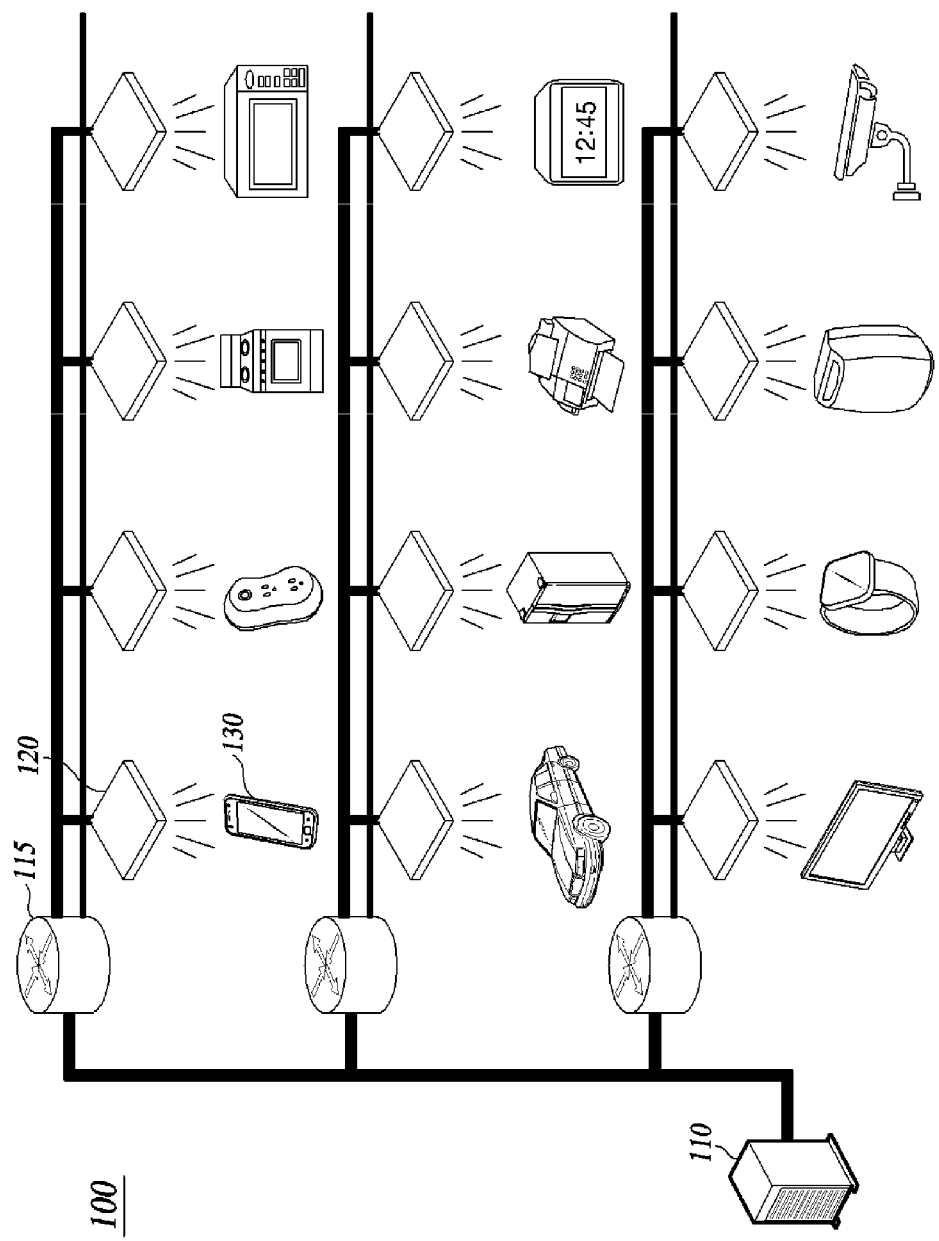
FIG. 1 is a diagram illustrating a visible light communication Internet of Things (IoT) system according to an embodiment of the present disclosure.

Hereinafter, some embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein will be omitted when it may make the subject matter of the present disclosure rather unclear.

Additionally, various terms such as first, second, A, B, (a), (b), etc., are used solely for the purpose of differentiating one component from the other but neither imply nor suggest the substances, the order or sequence of the components. Throughout this specification, when a part "includes" or "comprises" a component, the part may further include other components, and such other components are not excluded unless there is a particular description contrary thereto. Terms such as "unit," "module," and the like refer to units for processing at least one function or operation, which may be implemented by hardware, software, or a combination thereof.

FIG. 1 is a diagram illustrating a visible light communication (VLC) Internet of Things (IoT) system according to an embodiment of the present disclosure.

Referring to FIG. 1, a VLC IoT system 100 according to an embodiment of the present disclosure includes a server 110, a lighting device 120, and a terminal 130.

The server 110 is a management device of the VLC IoT system that manages membership information about a terminal, such as whether the terminal is ready for communication, whether the terminal has moved, or when the provided visible light IoT service is canceled.

The server 110 is connected to the lighting device 120 over a wired or wireless network for a control operation. The wired network includes wired communication using Ethernet communication, a universal serial bus (USB), a wire, a twisted pair of wires, a coaxial cable, an optical link, and the like. The wireless network may include Bluetooth, Radio Frequency Identification (RFID), Infrared Data Association (UDA), Ultra Ultra-Wide (UWB), ZigBee, Digital Living Network Alliance (DLNA), Wireless LAN (WLAN), Wi-Fi, Wireless Broadband (WiBro), World Interoperability for Microwave Access (WIMAX), High Speed Downlink Packet Access (HSDPA), and Long Term Evolution (LTE)/LTE-Advanced (LTE-A).

The server 110 is connected to the lighting device 120 via an aggregator 115. The server transmits a management message to one or more terminals capable of transmitting and receiving information to and from the lighting device using visible light communication and receives a response message for the management message, thereby managing the membership of the terminals. The server 110 stores a lighting device identifier such as an IP address of the lighting device 120 to transmit data to the lighting device 120 and stores identifiers of terminals to determine a terminal for which membership is being managed. In addition, the server 110 manages the membership of the terminals by transmitting a management message to one or more terminals capable of transmitting and receiving information to and from the lighting device using visible light communication and receiving response messages for the management message. The server 110 controls the lighting device to transmit a management message to each terminal at a preset time or periodically and checks, through the lighting device, whether or not a response message for the management message is received from the terminals, to manage the membership of the stored terminals. Details will be described with reference to FIGS. 2 to 4.

The aggregator 115 is a device connected to one or more lighting devices to transmit data received from the server 110 to a lighting device or to collect data transmitted by the one or more lighting devices and deliver the collected data at once or sequentially. The aggregator 115 may be implemented as a separate element between the server 110 and the lighting device 120, or may be implemented as a module in the server 110 to perform the above-described operation in the server 110.

The lighting device 120 is a device which transmits the data received from the server 110 to a terminal using visible light communication. The lighting device 120 generates a visible light signal representing data to be transmitted to the terminal by repeatedly turning on/off, and transmits the visible light signal to the terminal. Since the lighting device 120 repeatedly turns on/off at a speed unnoticeable by the human optic nerve system, the lighting device may maintain the function of lighting while transmitting data. The lighting device 120 may be implemented as a light emitting diode (LED), but is not limited thereto. The lighting device may be replaced with any device that emits visible light, such as a fluorescent lamp or visible light laser.

The lighting device 120 has a wired or wireless communication module to enable wired/wireless network communication. The lighting device 120 includes a wired communication module when the lighting device is configured to transmit and receive data to and from the server 110 using wired network communication, and includes a wireless communication module when the lighting device is configured to use wireless network communication. The lighting device 120 receives data or messages from the terminal 130 using a wireless communication module. The lighting device 120 may include both a wired communication module and a wireless communication module, or include a wireless communication module alone.

The lighting device 120 delivers data to a terminal using light in the range of visible light wavelengths. The lighting device 120 is connected to the server 110 over a wired/wireless network as described above, and receives data having a form transmittable from the server 110 over the wired/wireless network. The lighting device 120 analyzes the received data to check the type of control data, and generates data having a form transmittable through visible light communication. The lighting device 120 includes information that enables determination of the type of control data in the data having a form transmittable through visible light communication.

The lighting device 120 stores identifiers of terminals so as to identify terminals located under the transmission coverage of the visible light signal thereof or to manage the membership of the terminals regarding, for example, determination of a terminal to which a visible light communication IoT service is to be provided.

The terminal 130 is a device that extracts data from the visible light signal received from the lighting device 120. The terminal 130 receives the visible light signal from the lighting device 120 using a visible light reception module. The visible light reception module may be implemented as a camera, a photodiode, or the like, but is not limited thereto. Any module capable of receiving visible light may be employed in place of the visible light reception module. The terminal 130 may employ the visible light reception module as a built-in module or an external module. The terminal 130 receives data over a visible light signal emitted from the lighting device 120. Upon receiving the data, the terminal 130 analyzes the received data and recognizes that the data is a management message for managing the membership of a terminal. When the terminal 130 is a management target, the terminal 130 transmits a response message to the lighting device 120. Here, the management target refers an object that should transmit a response message in response to the management message upon receiving the management message from the lighting device 120. All terminals that receive the management message may be the management targets, or only some of the terminals that receive the management message may be the management targets.

The terminal 130 may be implemented as a smart device such as a smartphone or a tablet, a notebook computer, a laptop, or a personal digital assistant (PDA), but is not limited thereto. The terminal 130 may be implemented as an IoT device that is equipped with a sensor including a light receiving sensor and a communication function and disposed in a variety of objects such as a household appliance, a power outlet, an automobile, and the like, and is capable of connecting to the Internet.

Here, the identifier of the lighting device 120 or the identifier of the terminal 130 refers to information for identifying each lighting device or terminal. As the identifier, a unique production number assigned at the time of production of the lighting device or the terminal may be used, or unique identification information such as, for example, an IP address or a MAC address on the network used by the lighting device or the terminal may be used. The above-mentioned types of information are merely an example of the identifier, and the identifier includes any information by which each lighting device or terminal can be identified.

Figure 2:
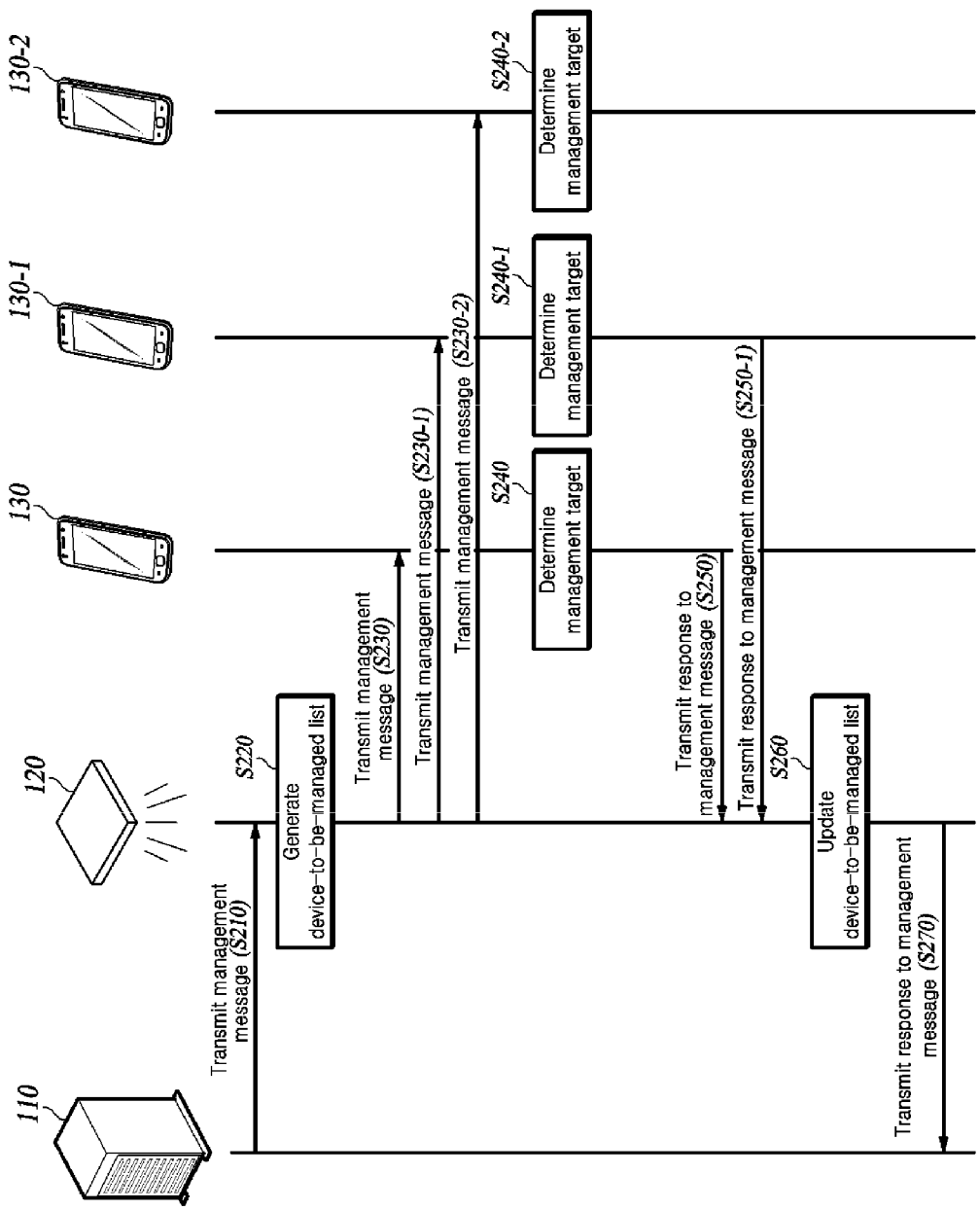
FIG. 2 is a flowchart illustrating a process in which a server manages terminals using a lighting device according to an embodiment of the present disclosure.

FIG. 2 is a flowchart illustrating a process in which a server manages terminals using a lighting device according to an embodiment of the present disclosure.

The server 110 transmits a management message to the lighting device 120 (S210). The server 110 generates a management message including, in the header, information indicating a control message for managing the membership of a terminal, and transmits the management message to the lighting device 120.

The lighting device 120 generates a device-to-be-managed list (S220). The lighting device 120 sets the device-to-be-managed list by setting all or a part of the stored identifiers of the terminals as management targets. For example, when a small number of terminals is communicating with the lighting device 120, all the terminals stored in the lighting device 120 may be set as management targets. However, when the number of terminals communicating with the lighting device 120 is greater than or equal to a predetermined number, overhead may occur in the lighting device 120 if responses to the management message are received from the terminals at one time. Accordingly, the lighting device 120 may set all the stored terminals or only a part of the stored terminals as management targets depending on the number of stored terminals. In the case where only a part of the stored terminals is set as management targets, the lighting device 120 may set the other terminals as management targets immediately or a preset time after management of the terminals set as management targets is terminated.

The lighting device 120 sets management targets using the identifiers of the terminals. Only terminals having identifiers satisfying a specific condition are set as management targets. For example, the lighting device 120 may set terminals whose identifiers have the last digit set to an odd number as management targets, or may set terminals whose identifiers have the last digit set to a specific number as management targets. Alternatively, in order to classify the terminals into several groups, terminals whose identifiers yield the same remainder when divided by a specific number may be set as management targets. The lighting device generates a device-to-be-managed list including the identifiers of the terminals set as the management targets. By generating the device-to-be-managed list, the lighting device 120 may clearly identify the terminals which the lighting device 120 has set as terminals to respond and terminals that have responded among the set terminals.

The lighting device 120 transmits a management message to the terminal 110 (S230). In transmitting the management message for managing the membership of the terminal, the lighting device 120 may broadcast a visible light signal such that any terminal including a specific terminal within the transmission coverage of the visible light signal can receive and check the message.

The terminal 110 determines whether the terminal is a management target (S240). In the case where the lighting device generates a device-to-be-managed list in operation S220 and sets only some of the terminals rather than all the terminals as the management targets, the terminal 110 analyzes the management message and determines whether the terminal itself is a management target. In FIG. 2, it is assumed that terminals 130, 130-1 and 130-2 are all management targets in a situation where only some terminals are set as management targets.

The lighting device 120 receives a response message to the management message from terminals which are management targets (S250). The lighting device 120 determines whether response messages for the management message have been received from all terminals which are management targets. There is a possibility that failure occurs in communication between the terminals 130, 130-1 and 130-2 and the lighting device 120. There may be a situation in which the terminal 130, 130-1, 130-2 moves and receives a visible light signal from a lighting device different from the lighting device with which the identifier of the terminal has been registered. In the above-described situation, it is difficult for the terminal to receive the management message or to transmit a response message even if the terminal receives the management message. Therefore, the lighting device 120 receives response messages to the management message from terminals which are management targets, and determines whether the response messages have been received from all terminals which are management targets.

The lighting device 120 updates the device-to-be-managed list (S260). The lighting device 120 determines whether response messages to the management message have been received from all the terminals which are management targets through operation S250, and updates the device-to-be-managed list according to the determination. The lighting device 120 updates the device-to-be-managed list by classifying the management target terminals into terminals that have transmitted a response message to the management message and terminals that have not transmitted a response message. In addition, since the lighting device 120 broadcasts the management message at random, not only the terminals pre-stored in the lighting device 120 but also other terminals can receive the management message. Even a terminal that is not pre-stored in the lighting device 120 may become a management target depending on the identifier thereof. Thus, a terminal that is not in the device-to-be-managed list generated in operation S220 but has transmitted a response message for the management message is added to the device-to-be-managed list and it is explicitly indicated that the terminal is a newly added terminal.

The lighting device 120 transmits a response message to the management message to the server 110 (S270). The lighting device 120 transmits, to the server 110, a response message including the identifiers of terminals that have not transmitted a response message to the management message among the management target terminals and an identifier of a terminal that is not pre-registered with the lighting device but has transmitted a response message to the management message. As the server 110 receives the response message to the management message from the lighting device, the server 110 recognize a terminal is not capable of communication or a terminal that has moved to a specific lighting device from another lighting device.

Figure 3:
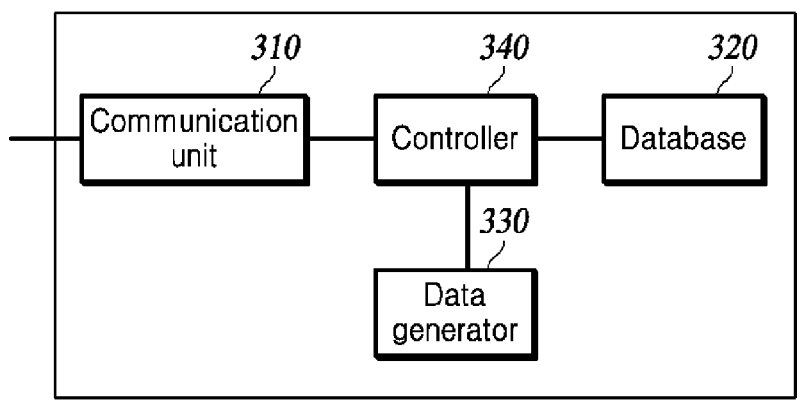
FIG. 3 is a configuration diagram of a server according to an embodiment of the present disclosure.

FIG. 3 is a configuration diagram of a server according to an embodiment of the present disclosure.

Referring to FIG. 3, a server 110 according to an embodiment of the present disclosure includes a communication unit 310, a database 320, a data generator 330, and a controller 340.

The communication unit 310 transmits a management message to the lighting device 120 under control of the controller 340. The communication unit 310 may be implemented as a wired communication module or a wireless communication module depending on the type of connection with the lighting device 120. The communication unit 310 transmits data generated by the data generator 330 to the lighting device 120 by wire or wirelessly according to the implemented form thereof.

The database 320 stores the identifiers of a lighting device and the identifier of a terminal, and distinguishes each lighting device and each terminal using the stored identifier of the lighting device or the terminal. In order to receive specific information or a specific service through visible light communication, the lighting device and the terminal are pre-registered with the server 110. The lighting device and the terminal are registered by transmitting the identifiers thereof to the server 110, and the server 110 stores the received identifiers of the lighting device and the terminal in the database 320. The database 320 stores the identifier of the terminal by matching the identifier of the terminal with the identifier of the lighting device. Since a specific terminal is positioned near a specific lighting device and thus can receive data only from the specific lighting device, the database 320 may store the identifier of the terminal by matching the identifier of the terminal with the identifier of the lighting device. When the server 110 receives the identifier of the terminal together with the identifier of the lighting device from the lighting device, the database 320 stores the received identifiers of the terminal and the lighting device together. When the server 110 receives the identifier of the terminal directly from the terminal rather than from the lighting device, the server 110 identifies the location information about each of the terminal and the lighting device. The controller 340 of the server 110 may receive the location information directly from the terminal or identify the location of the terminal using the properties (for example, the signal strength or the direction in which the signal is received) of a signal transmitted and received by the terminal and the server. The location information about the lighting device may also be identified in a similar manner. Using the identified location information about each of the terminal and the lighting device, the database 320 may store the identifier of a specific terminal by matching the identifier of the specific terminal with the identifier of a lighting device located closest to the specific terminal.

The data generator 330 generates a management message to be transmitted to terminals, using the lighting device 120. The management message will be described with reference to FIG. 4.

Figure 4:
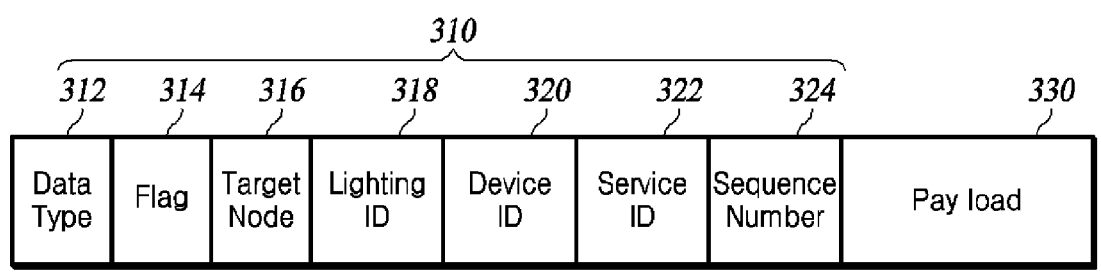
FIG. 4 is a diagram illustrating a configuration of data transmitted and received between a server and a lighting device according to an embodiment of the present disclosure.

FIG. 4 is a diagram illustrating a configuration of data transmitted and received between a server and a lighting device according to an embodiment of the present disclosure.

A management message 400 includes a header 410 and a payload 430.

The header 410 of the management message includes a data type field 412, a flag field 414, a target node field 416, a lighting ID field 418, a device ID field 420, a service ID field 422, and a sequence number 424.

The data type field 412 is a field for checking the type of data to be transmitted. The data type field 412 is used to determine whether the type of data to be transmitted by the server is control data for controlling a target node of the data or information data for transferring information to the target node of the data. For example, when the value of the data type field 412 is 0, the data type may be control data. When the value of the data type field 412 is 1, the data type may be information data. The server 110 transmits the management message to the lighting device 120 to control the lighting device to transmit the management message to the terminal in order to check the membership of the terminal. Therefore, an indication (e.g., 0) indicating control data is specified in the data type field 412.

The flag field 414 is a field for checking what kind of control is performed when the type of data to be transmitted is control data. The flag field 414 indicates that data to be transmitted corresponds to data for causing a target node to perform a specific operation, data for changing the setting of the target node, or a management message for checking and managing the membership of the target node. For example, if the value of the flag field 414 is 0, the data may be control data for changing the setting of the lighting device 120 or the terminal 130. When the value is 1, the data may be control data for causing the controller 130 to perform a specific operation. When the value is 2, the data may be a management message for checking and managing the membership of the target node. Since the management message transmitted by the server 110 is a management message for checking the membership of the terminal, an indication (e.g., 2) indicating that the message is a management message for checking the membership of the terminal is specified in the flag field 414.

The target node field 416 is a field that allows the server to check the node which is the final destination position of the data to be transmitted. The target node field 416 is used to determine whether the data to be transmitted by the server is data for the lighting device or data for the terminal 130. For example, when the value of the target node field 416 is 0, the data may be data to be transmitted to a lighting device. When the value of the target node field 416 is 1, the data may be data to be transmitted to a terminal. Since the server 110 should control the lighting device to broadcast the management message, an indication (e.g., 0) indicating that the lighting device is a target node is specified in the target node field 416.

The lighting ID field 418 is a field for identifying a lighting device to which the data is to be transmitted. When the data to be transmitted by the server is data for a lighting device, the lighting ID field 418 contains the identifier of the lighting device corresponding to the destination of the data. On the other hand, when the data to be transmitted by the server is data for the terminal, the lighting ID field 418 contains the identifier of a lighting device via which the data is to be transmitted to the terminal.

The device ID field 420 is a field for identifying a terminal to receive the data. When the data to be transmitted by the server is data for a lighting device, the device ID field 420 has a preset meaningless value. When the data to be transmitted by the server is data for a terminal, the device ID field 420 includes an identifier of the terminal to receive the data. Since the management message transmitted by the server 110 should be delivered to all terminals within the transmission coverage of the visible light signal of the lighting device, rather than to a specific terminal, an indication for causing the lighting device 120 to broadcast a management message to all terminals is specified by specifying a preset indication, for example, by setting all bits in the terminal identifier field 420 to 1.

The service ID field 422 is a field for identifying a service to be used by a terminal to receive the data. When the data to be transmitted by the server is data for the terminal, the service ID field 422 includes a stored service identifier along with the identifier of the terminal. This field remains unused in an embodiment of the present disclosure, and has a preset meaningless value.

The sequence number field 424 is a field that allows the server to identify each of the data to be transmitted. Typically, the server 110 transmits and receives a lot of data to and from a specific terminal. Accordingly, the server 110 needs to distinguish which of the response data received from the terminal is response data corresponding to specific data transmitted to the terminal. The sequence number field 424 is a field for identifying the sequence number. If the sequence number of the data transmitted by the server to the terminal matches the sequence number of the response data transmitted to the server by the terminal, it may be determined that the response data is a response to specific data transmitted to the terminal by the server. On the other hand, when the sequence numbers do not match, it may be determined that both data are irrelevant to each other.

The data transmitted by the server 110 to the lighting device 120 for membership management has the same header 410 of the management message 400 as the data transmitted from the lighting device 120 to the server 110 to inform the server 110 of the membership after membership management. Since both the data transmitted from the server 110 to the lighting device 120 and the data transmitted from the lighting device 120 to the server 110 are data for management of membership of the terminal, both data have the same value of each field in the header of the management message. However, the payload of the data transmitted from the server 110 to the lighting device 120 for membership management includes information necessary for the lighting device to operate according to the management message, while the payload of the data transmitted from the lighting device 120 to the server 110 includes membership status information about the terminal. The membership status information about the terminal in the payload of the data transmitted from the lighting device 120 to the server 110 will be described later.

The data generator 330 includes information necessary for the lighting device to operate according to the management message in the payload 430 of the management message.

The data generator 330 includes the header 410 and the payload 430 of the management message in a header or a payload of data of the physical layer, which is the lowest layer in the OSI model, or a higher layer thereof to generate data of the physical layer or the higher layer thereof. The data generator 330 generates data of the physical layer or the higher layer including a management message in the header or the payload such that the communication unit 310 can transmit the management message to the lighting device 120.

The controller 340 controls the lighting device to transmit the management message to the lighting device 120 at a preset time or periodically.

The controller 340 includes a timer (not shown) and thus controls the data generator 330 to generate a management message at a preset time or periodically. In addition, when the management message is generated, the controller 340 controls the communication unit 310 to transmit the management message to the lighting device 120 having the lighting ID included in the management message.

Figure 5:
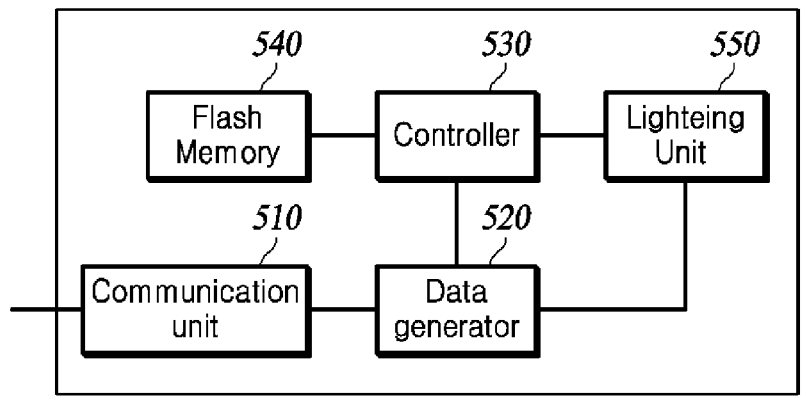
FIG. 5 is a configuration diagram of a lighting device according to an embodiment of the present disclosure.

FIG. 5 is a configuration diagram of a lighting device according to an embodiment of the present disclosure.

Referring to FIG. 5, the lighting device 120 according to an embodiment of the present disclosure includes a communication unit 510, a data manager 520, a controller 530, a flash memory 540, and a lighting unit 550.

The communication unit 510 is connected to the server 110 using a wired/wireless communication module and receives a management message from the server 110. The communication unit 510 receives a response message to the management message from the terminal 130 using the wireless communication module. Also, the communication unit 510 transmits the response message regenerated by the data manager 520 in response to the management message to the server 110.

The data manager 520 analyzes the received management message and generates data that the lighting unit 550 can transmit to the terminal using visible light communication. The data manager 520 analyzes the received management message and distinguishes between the header and the payload of the management message. When recognizing that the data received from the server 110 is a management message, the data manager 520 generates management data that the lighting unit 550 can transmit to the terminal 130 using visible light communication. Details will be described with reference to FIG. 6.

Figure 6:
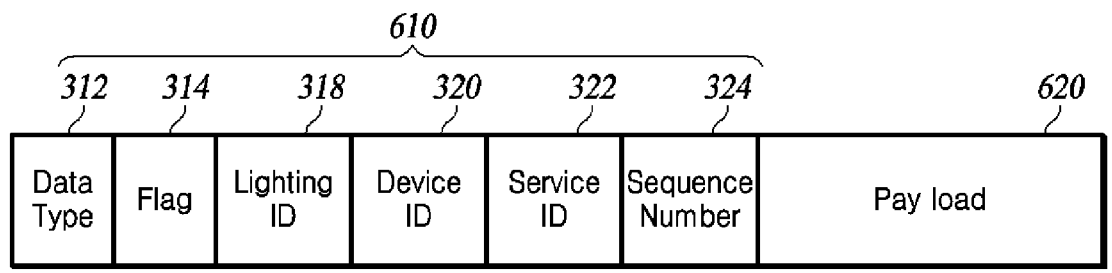
FIG. 6 is a diagram illustrating a configuration of data transmitted and received between a lighting device and a terminal according to an embodiment of the present disclosure.

FIG. 6 is a diagram illustrating a configuration of data transmitted and received between a lighting device and a terminal according to an embodiment of the present disclosure.

A management message 600 to be transmitted to the terminal 130 using visible light communication or a response message 600 to be transmitted to the lighting device 120 by the terminal 130 in response to the received management message includes a header 610 and a payload 620. The management message or the response message has the same header 610 and the same payload 620 as the management message or the response message is a message for management of the membership of the terminal 130.

The data manager 520 generates the management message 600 including only necessary fields of the header 410 of the management message 400 in the header 610.

The data manager 520 includes the data type field 412 of the management message 400 in the data header of the management message 600. The data manager 520 includes the data type field 412 of the management message 400 such that the terminal receiving the data can recognize that the data is control data.

The data manager 520 includes the flag field 414 of the header 410 of the management message 400 in the data header of the management message 600. Based on the flag field 420, the terminal 130 may check the kind of the control data transmitted thereto.

The data manager 520 includes the lighting ID field 418 of the header 410 of the management message 400 in the data header of the management message 600. When the terminal 130 receives data from the lighting device 120, the source that transmitted the data is identified from the lighting ID field 418. In addition, when terminal 130 transmits response data for the received data, the lighting device ID may be used for a destination to receive the response data.

The data manager 520 includes the device ID field 420 of the header 410 of the management message 400 in the data header of the management message 600. Based on the device ID field 420, the terminal 130 may recognize that the management data is broadcast from the lighting device 120. When the terminal 130 recognizes that the management data is broadcast using the device ID field 420, the terminal 130 determines whether the terminal 130 is a management target by checking the payload 620 in the management message 600.

The data manager 520 includes the sequence number field 424 of the header 410 of the management message 400 in the data header of the management message 600. Using the sequence number field 424, the terminal 130 identifies the received data and the data for which response data is provided later.

The data manager 520 includes the data included in the payload 420 of the management message 400 in the payload 620 of the management message 600. In addition, the data manager 520 includes, in the payload 620, an offset value generated by the controller 530, or the offset value and a group number value generated by the controller 530.

The data manager 520 generates data of the physical layer or the higher layer thereof by including the header 610 and the payload 630 of the management message 600 in the header or payload of the data of the physical layer or the higher layer in the OSI model. The data manager 520 generates the data of the physical layer or the higher layer thereof so as to have a protocol that enables visible light communication (VLC). That is, the data manager 520 regenerates the data received by the communication unit 510 from the server 110 using the wired or wireless communication such that the lighting unit 550 can transmit the data using VLC.

In addition, the data manager 520 analyzes the response message received from the terminal 130, and recognizes the identifier of the terminal included in the response message. By recognizing the identifier of the terminal included in the response message, the data manager 520 may identify the terminal that has transmitted the response message.

Under control of the controller 530, the data manager 520 regenerates a response message including the identifier of a terminal which is a management target but has not transmitted a response message, and the identifier of a terminal that is not a management target but has transmitted a response message in the payload in response to the management message. As described above, the data manager 520 has the same header as that of the management message received from the server 110, and regenerates a response message including the identifier of the above-mentioned terminal in the payload.

Upon recognizing that the management message 400 is received from the server 110 according to the analysis of the data manager 520, the controller 530 sets management targets to generate a device-to-be-managed list. As described above, the controller 530 may set all terminals stored in the flash memory 540 as management targets, or may set only a part of the terminals stored in the flash memory 540 as management targets in some cases. In the case where only some of the stored terminals are set as management targets, the lighting device 120 may set the other terminals as management targets immediately or a preset time after management of the terminals set as management targets is terminated. When setting a terminal to transmit a response message, the controller 530 sets an offset value, or an offset value and a group number value. The controller 530 sets a terminal that is to transmit the response message using an identifier. The controller 530 may set only a terminal whose identifier has the last digit matching the offset value as a terminal to transmit a response message. Alternatively, the controller 530 may set the number of groups into which the terminals 130 are divided, and set only terminals whose identifiers yield the remainder matching the offset value when divided by the number of divided groups, as terminals to transmit the response message. For example, when the terminals are divided into n groups, the group number value is n and the offset value is 0 to n-1. The terminal divides the identifier thereof by n, identifies the remainder, and checks whether the remainder is among the offset values to determine whether the terminal is an object to transmit a response message (a management target). The controller 530 generates a device-to-be-managed list with the management targets set by the above-described method. By generating the device-to-be-managed list, the controller 530 may identify which of the terminals set to transmit a response message transmitted has transmitted the response message and which terminal has not transmitted the response message. After generating the device-to-be-managed list, the controller 530 controls the data manager 520 to include the set offset value, or the offset value and group number value in the payload 620 of the management message 600.

The controller 530 identifies which terminals have transmitted the response message for the management message according to the analysis of the data manager 520. The terminals having transmitted the response message may include a terminal classified as a management target and a terminal not classified as a management target. The terminal not classified as a management target transmits a response message for the following reason. The device-to-be-managed list is merely a list generated by the lighting device 120 to manage the membership of the terminals and the management message is substantially broadcast to all terminals within the transmission coverage of the visible light signal of the lighting device 120. That is, all terminals may receive the management message. When a terminal corresponds to a management target according to the identifier thereof, the terminal transmits a response message to the management message. The controller 530 compares the identifier of the terminal included in the response message with the device-to-be-managed list, thereby identifying terminals that have transmitted the response message among the management targets, terminals that have not transmitted the response message among the management targets, and terminals which are not management targets but have transmitted the response message. The controller 530 controls the data manager 520 to include, in the payload of the response message to the management message 600, the identifiers of terminals that have not transmitted the response message among the management targets and the identifiers of terminals which are not management targets but have transmitted the response message. As the identifiers of the corresponding terminals are included in the payload, the server 110 may check the membership information about the terminals, such as whether communication is impossible or whether the terminal is moved from a specific light to another light.

The flash memory 540 stores identifiers of terminals capable of transmitting data thereto using wireless communication and the device-to-be-managed list generated by the controller 530.

The lighting unit 550 modulates the management message 600 generated by the data manager 520 into a visible light signal and transmits the visible light signal to all terminals within the transmission coverage of the visible light signal.

Figure 7:
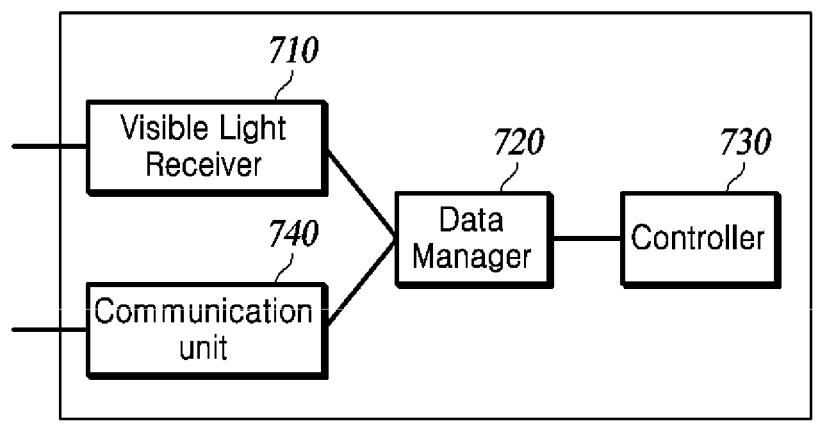
FIG. 7 is a configuration diagram of a terminal according to an embodiment of the present disclosure.

FIG. 7 is a configuration diagram of a terminal according to an embodiment of the present disclosure.

Referring to FIG. 7, the terminal 130 according to an embodiment of the present disclosure includes a visible light receiver 710, a data manager 720, a controller 730, and a communication unit 740.

The visible light receiver 710 receives a management message from the lighting device 120. The visible light receiver 710 may be implemented as a built-in or external camera or a visible light reception module in the terminal 130, and may receive a management message transmitted over a visible light signal.

The data manager 720 analyzes the received visible light signal, determines that the signal is a management message, and checks an offset value, or the offset value and a group number value included in the management message.

By checking the offset value, or the offset value and the group number value included in the management message analyzed by the data manager 720, the controller 730 determines whether the terminal 130 is a management target. As described above, the controller 730 determines whether the terminal 130 is a management target by determining whether the last digit of the identifier of the terminal matches the offset, or whether the identifier of the terminal divided by the group number value yields a remainder equal to the offset. When determining that the terminal is a management target, the controller 730 controls the communication unit 740 to transmit the received management message as a response message to the lighting device 120 without generating a separate message. On the other hand, when the controller 730 determines that the terminal is not a management target, it does not take any other action.

The communication unit 740 transmits the response message to the lighting device 120.

Although exemplary embodiments of the present disclosure have been described for illustrative purposes, those skilled in the art will appreciate that various modifications, additions and substitutions are possible, without departing from the spirit and scope of the appended claims. Therefore, the present disclosure is to be construed as illustrative rather than limiting, and the scope of the present disclosure is not limited by the embodiments. The scope of protection of the disclosure should be construed according to the appended claims, and all technical ideas within the scope of the claims and equivalents thereto should be construed as being within the scope of the disclosure.

DESCRIPTION OF REFERENCE NUMERALS

100: Visible light communication IoT system
110: Server
120: Lighting device
130: Terminal
310, 510, 740: Communication unit
320: Database
330: Data generator
340, 530, 730: Controller
310: Visible light communication device management (VDMP) protocol layer
315: Application layer
400, 600: Management message
410, 610: Header
412: Data type field
414: Flag field
416: Target node field
418: Lighting ID field
420: Device ID field
422: Service ID field
424: Sequence number field
430, 620: Payload
520, 720: Data manager
540: Flash memory
550: Lighting unit
710: Visible light receiver

CROSS-REFERENCE TO RELATED APPLICATIONS

This application claims priority to Korean Patent Application No. 10-2016-0157606, filed on Nov. 24, 2016. The entire contents of those are incorporated herein by reference.

What is claimed is:

1. A lighting device for checking state information about one or more terminals used for visible light communication, comprising:
a communication unit configured to receive a first management message to be transmitted to the terminals from a server and a response message for a second management message from some or all of the terminals;
a data manager configured to:
divide the first management message and the response message for the second management message into a header and a payload, and check information included in the header or payload; and
regenerate the second management message having a header containing a part of information included in the header of the first management message and a payload containing information for instructing only a preset terminal to respond;
a lighting unit configured to modulate the second management message into a visible light signal and transmit the visible light signal to the one or more terminals;
a controller configured to generate a management list for a preset terminal set to respond to the second management message and update the management list using the response message to the second management message; and
a database configured to store identifiers of the one or more terminals and the management list.

2. The lighting device of claim 1, wherein the first management message includes a part or an entirety of:
a flag field, a target node field, a lighting identification (ID) field, a device ID field, a service ID field, and a sequence number field in the header of the first management message.

3. The lighting device of claim 2, wherein the data manager checks the data type field and the flag field in the header of the first management message to determine whether the first management message is a management message for checking the state information about the one or more terminals.

4. The lighting device of claim 1, wherein, among one or more terminals each having an identifier stored in the database, the controller sets a terminal as the preset terminal when a value of a preset digit in the identifier of the terminal is equal to an offset.

5. The lighting device of claim 1, wherein, among one or more terminals each having an identifier stored in the database, the controller sets a terminal as the preset terminal when a remainder obtained by dividing the identifier of the terminal by a group number value is equal to an offset.

6. The lighting device of claim 1, wherein the controller updates the management list by classifying the terminals into a terminal included in the management list and having transmitted the response message for the second management message, a terminal included in the management list but not having transmitted the response message for the second management message, and a terminal not included in the management list but having transmitted the response message for the second management message, using identifiers of the terminals included in the response message for the second management message.

7. The lighting device of claim 6, wherein the data manager generates a response message to the first management message, the response message having a header containing information identical to the header of the first management message, and a payload containing an identifier of the terminal included in the management list but not having transmitted the response message to the second management message and an identifier of the terminal not included in the management list but having transmitted the response message to the second management message.

8. The lighting device of claim 7, wherein the communication unit transmits the response message to the first management message generated by the data manager to the server.

* * * * *